United States Patent [19]

Wraight

[11] Patent Number: 4,676,022

[45] Date of Patent: Jun. 30, 1987

[54] ROTATABLE INSECT TRAP DEVICE

[76] Inventor: Peter D. Wraight, 3030 Bonney Briar Dr., Missouri City, Tex. 77459

[21] Appl. No.: 842,130

[22] Filed: Mar. 20, 1986

[51] Int. Cl.⁴ .............................................. A01M 3/04
[52] U.S. Cl. ...................................................... 43/121
[58] Field of Search ................ 43/121, 131, 133, 136; 403/90, 135, 15/244 A, 144 B

[56] References Cited

U.S. PATENT DOCUMENTS

| | | | |
|---|---|---|---|
| 578,998 | 3/1897 | Loebs | 403/90 |
| 585,549 | 6/1890 | Atwater et al. | 403/90 |
| 979,640 | 12/1910 | Boerngen | 43/136 |
| 1,154,310 | 9/1915 | Hemenway | 43/136 |
| 1,488,145 | 3/1924 | Bellows | 43/136 |
| 1,671,991 | 6/1928 | Lindner | 403/90 |
| 3,604,044 | 9/1971 | Johnson | 403/90 |
| 4,126,959 | 11/1978 | Graham | 43/136 |
| 4,222,680 | 9/1980 | Browning | 403/90 |
| 4,345,351 | 8/1982 | Moss | 15/144 B |

FOREIGN PATENT DOCUMENTS 440670 1/1936 United Kingdom ................. 287/12

Primary Examiner—M. Jordan
Attorney, Agent, or Firm—Dodge, Bush & Moseley

[57] ABSTRACT

A rotatable insect trap device for use with a disposable insect trap having an opening therein is disclosed. The device comprises a hollow holder sleeve for removably holding the disposable rectangular insect trap, an elongated rod for positioning the sleeve and a friction ball pin and socket assembly connected between the sleeve and the rod. The holder sleeve rotates upon turning the elongated rod to operably position the opening of the insect trap in a desired direction.

17 Claims, 5 Drawing Figures

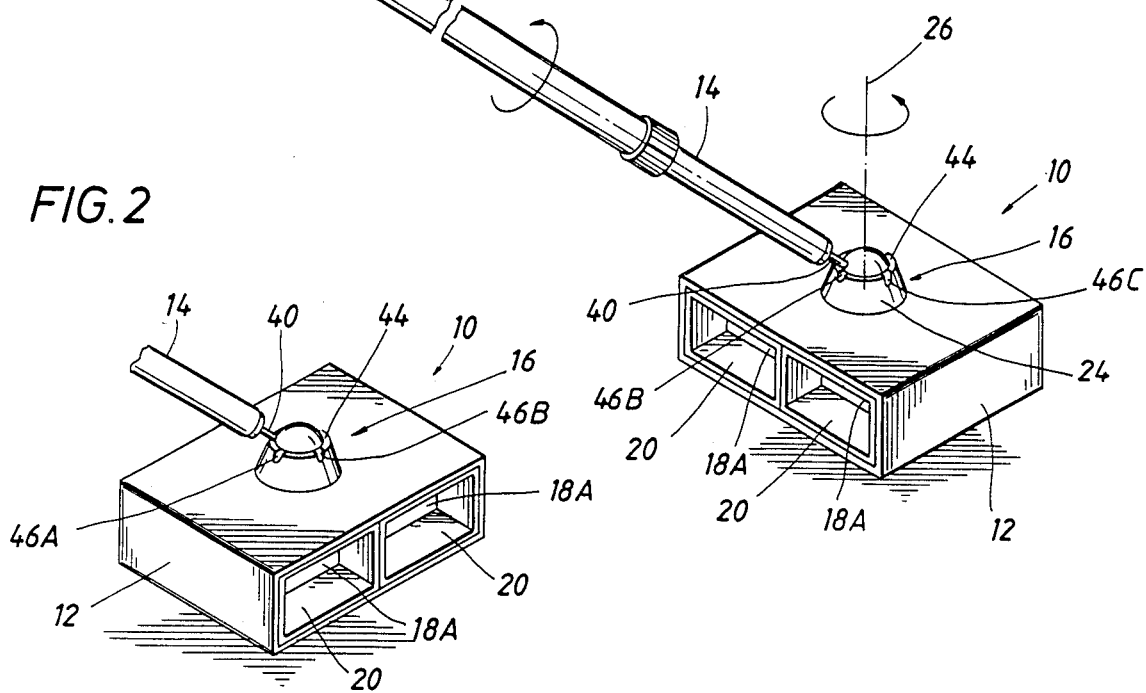
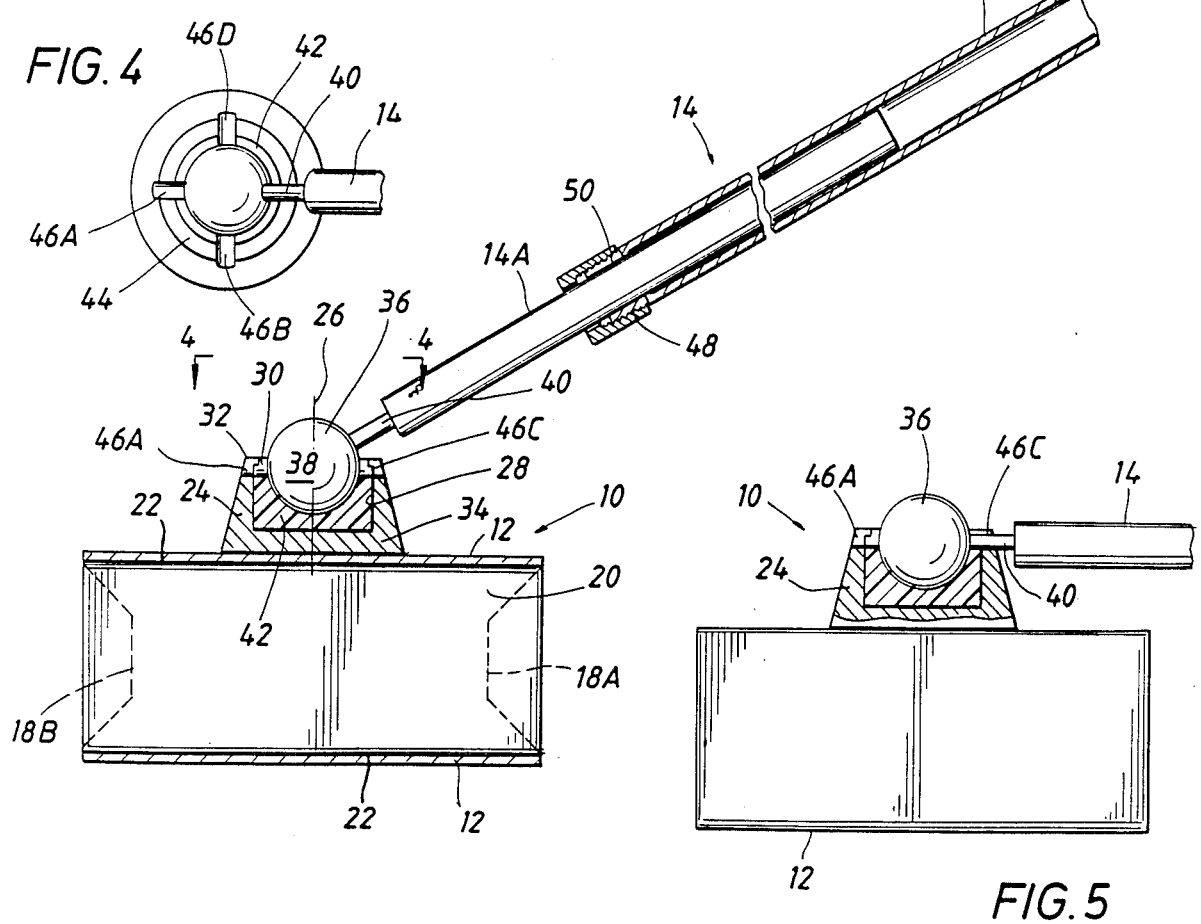

4,676,022

ROTATABLE INSECT TRAP DEVICE

BACKGROUND OF THE INVENTION

1. Field of the Invention

This invention relates to the field of the insect traps, in particular, to a rotatable insect trap apparatus for use with a disposable insect trap.

2. Description of the Prior Art

Conventional stationary insect traps are known in the prior art. These conventional traps are placed where insects crawl or hide, such as the kitchen, bathroom, laundry, basement and garage. These insect traps are sized so at to allow placement along baseboards, under sinks, near refrigerators and stoves, in closet pantries, cabinets and behind toilets.

These conventional insect traps have openings so as to allow insects to enter at either end of the trap. The conventional traps futher provide a "black hole" and a natural food bait that lures insects out of hiding places and into the trap. Once inside, the insects get stuck in a powerful adhesive and die.

The insect trap is designed specially for small insects including cockroaches, waterbugs, crickets and other small crawling insects. The traps kill without poison so that they can be used anywhere without fear of danger to pets or food. These conventional insect traps include "Black Flag Roach Moles" waterbug and roach traps distributed by Boyle-Midway, Inc. of New York, N.Y.; "Raid" waterbug and roach traps by S. C. Johnson & Son, Inc. of Racine, Wis. and "D-Con" roach trap by the D-Con Company, Inc.

All of the above traps are stationary and do not allow the insect trap to be quickly positioned from a distance in front of a running insect after it is sited. This ability to catch a running insect from a safe distance is particularly desirable for those who are frightened or disgusted by the sight of insects, particularly cockroaches.

Identification of Objects of the Invention

It is an object of the present invention to provide a novel and unobvious rotatable insect trap apparatus which is positioned from a distance.

It is another object of the present invention to provide an insect trap which can easily "catch up" with a running insect and which can be quickly rotated to position the opening of the insect trap in a desired direction.

It is another object of the present invention to provide a low cost yet effective apparatus to kill insects while eliminating clean up, poisons and stains on surfaces from use of sprays or impact.

It is another object of the present invention to provide an insect trap, as aforesaid, which provides a great deal of satisfaction and feeling of accomplishment by catching an insect in the trap while leaving no mess.

SUMMARY OF THE INVENTION

A rotatable insect trap apparatus for use with a disposable insect trap having an opening therein is disclosed. The apparatus comprises a hollow holder sleeve for removably holding the disposable rectangular insect trap, an elongated rod for positioning the sleeve and a friction ball pin and socket assembly connected between the sleeve and the rod for rotating the holder sleeve upon turning the elongated rod to operably position the opening of the insect trap in a desired direction.

The holder sleeve preferably comprises a hollow sleeve sized to provide a friction fit with an exterior surface of the rectangular disposable insect trap for removably holding the trap. The friction ball pin and socket assembly includes a socket housing, a ball pin having a shank and a friction bearing insert, The elongated rod is rigidly axially secured to the shank of the ball pin to operably allow rotary motion of the holder sleeve upon turning the rod to position the opening of the insect trap.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which FIG. 1 is a perspective view of the rotatable insect trap apparatus of the present invention with the elongated rod shown in broken view;

FIG. 2 is a perspective view of the apparatus of the present invention illustrating the positioning of the apparatus after rotating the elongated rod as shown in FIG. 1;

FIG. 3 is a side elevational view of the rotatable insect trap apparatus showing the sleeve, the friction ball pin and socket assembly and the telescoping rod in section;

FIG. 4 is a plan view of the ball pin and socket assembly taken along lines 4—4 of FIG. 3; and FIG. 5 is an elevational view, similar to FIG. 3, showing the elongated rod positioned at ninety degrees from the axis of a socket housing of the assembly.

DETAILED DESCRIPTION OF THE PREFERRED EMBODIMENT

It is well known that certain pests, such as cockroaches, when aware of a pursuing human, will seek the nearest dark opening so as to evade being killed. This invention takes advantage of this instinct of cockroaches and the like by providing an apparatus which may be easily manipulated to place a "dark hole" in the path of a fleeing roach. The apparatus includes a sticky trap inside the dark hole which immobilizes the roach.

The rotatable insect trap apparatus 10 embodying the present invention is shown in detail in FIGS. 1-5. The apparatus 10 includes a holder means or sleeve 12, an elongated rod 14 and rotating means or a friction ball pin and socket assembly, generally designated 16, for rotating the sleeve 12 upon turning the elongated rod 14 to position the opening 18 of the insect trap 20 in a desired direction.

The sleeve 12 is a rectangular hollow plastic sleeve sized to provide a friction fit with the exterior surface 22 of the rectangular insect trap 20, as best shown in FIG. 3. The preferred embodiment includes two traps 20 placed side by side, as best shown in FIGS. 1 and 2.

The wide angle friction ball pin and socket assembly 16 includes a socket housing 24 having an axis 26, as best shown in FIG. 1. The socket housing 24 has a cavity 28 therein. The cavity 28 has a mouth 30 at a first end 32. A second end 34 of the socket housing 24 is fixedly secured to the sleeve 12, as best shown in FIG. 3, by glue or conventional fasteners.

Additionally, the ball pin and socket assembly includes a ball pin 36 comprising a head 38 located in the cavity 28 and a shank 40 having an axis extending through the mouth 30 of the cavity 28. The wide angle friction ball pin and socket assembly 16 is rigidly and axially secured by the shank 40 to an elongated rod 14, as is shown in FIGS. 1–5. It is to be understood that the shank 40 and elongated rod 14 could be fabricated as one piece.

The assembly 16 further comprises a friction bearing insert 42 disposed in the cavity 28 between the socket housing 24 and the head 38 of the ball pin 36 to operably rotate the sleeve 12 upon rotation of the shank 40 or rod 14 about its axis. The insert 42 is preferably fabricated from an elastomeric material.

The first end 32 of the socket housing 24 has an upwardly facing surface 44. In one mode, when the shank 40 is at sixty degrees (60°) from the axis 26 of the housing 24 the shank 40 engages the surface 44. This engagement aids in the rotation of sleeve 12 upon rotation of the rod 14. The surface 44, as shown best in FIGS. 1, 2 and 4, allows the shank 40 and the rod 14 to move within sixty degrees (60°) from the axis 26 of the socket housing 24 thereby providing a wide angle of movement of the assembly 16.

The surface 44 has at least one notch 46 therein to allow positioning of the shank 40 and rod 14 at ninety degrees (90°) from the axis 26 of the socket housing 24, as best shown in FIG. 5. Preferably the socket housing 24 has only two notches at ninety degrees (90°) from each other, such as notches 46A and 46B. Alternatively, the socket housing 24 may have four notches 46A, 46B, 46C and 46D therein, as shown in FIGS. 1–5 and as best shown in the plan view of FIG. 4.

The notches 46 may be sized so as to provide a friction fit or snap fit with the shank 40 so that when the rod 14 and shank 40 are positioned, as shown in FIG. 5, the shank 40 will lock or snap into the notch 46C.

In the preferred embodiment, the elongated rod 14 is a telescoping rod to provide additional reach of the sleeve 12. As best shown in FIG. 3, the rod 14 comprises a first rod 14A concentrically received in a second rod 14B. A locking nut 48 is threadedly received about the threaded tapered end 50 of the second rod 14B to lock the telescoping rod at a desired length.

USE AND OPERATION

The amount of friction provided in the wide angle ball pin and socket assembly 16 is important to the operation of the invention. If the friction is too low, it will be difficult to position the apparatus on a floor, wall, ceiling or other surface. Conversely, if there is too much friction, the apparatus 10 will not rotate easily. The desired friction can be judged by the responsiveness of the sleeve 12 in overcoming friction forces on a surface, such as a floor, when the rod 14 is turned. An alternative embodiment of the present invention could include an adjustable friction force device for the assembly 16.

As shown in FIG. 1, by rotating the rod 14 about its axis, as indicated by the arrow about the rod 14, the sleeve 12 rotates, as indicated by the arrow about the axis 26, from the position shown in FIG. 1 to the position shown in FIG. 2. This rotation of the the sleeve 12 is achieved by the rotation of the head 38 against the friction insert 42 in the socket housing 24. The surface 44 of the socket housing 24 aids in the rotation of the sleeve only when the shank 40 is rotatably engaged with the surface 44, as discussed previously.

The friction ball pin ansd socket assembly has a wide angle of movement to permit the apparatus to present the maximum trapping area in front of the running insect. As best shown in FIGS. 1, 2 and 3, the angle of movement of the rod is approximately sixty degrees (60°) from the axis 26 of the socket housing 24 with a full three hundred and sixty degree (360°) rotational capability.

In the preferred embodiment, the head 36 is approximately one inch (1″) in diameter and is connected to the rod 14 by means of the steel shank 40 which is approximately ⅛″ in diameter and ½″ long. The thin shank 40 relative to the surface 44 permits the wide angle of movement discussed above and also allows positioning or locking of the shank 40 in the notches 46. The cooperation of the shank 40 and the notches 46 allow the insect trap to be positioned under very low clearance objects, such as a bed. The combined height of the sleeve 12 and the assembly 16 is preferably only 3.5″ in height to allow positioning under baseboards in a kitchen or bathroom. When two roach traps are mounted in a sleeve 12, as shown in FIGS. 1 and 2, and the assembly 16 is centrally positioned on the sleeve, the apparatus 10 is able to clear the baseboards of a kitchen or bathroom.

The preferred embodiment of the invention includes a telescoping rod which when fully extended reaches approximately seven feet (7′). A less expensive one piece rod extending approximately four feet (4′) could also be used. This reaching capability provided by the rod allows the apparatus to "catch up" with the running insect.

Various modification and alterations in the described structures will be apparent to those skilled in the art of the foregoing description which does not depart from the spirit of the invention. For this reason, these changes are desired to be included in the appended claims. The claims recite only limitations to the present invention in the description manner which is employed for setting forth the embodiment and is to be interpreted as illustrative and not limitative.

What is claimed is:

1. In combination a box shaped disposable insect trap having an opening therein and an apparatus for manipulating said trap, comprising
    a sleeve having an aperture for removably holding said disposable insect trap, said sleeve aperture being aligned with the trap opening when the trap is being held by said sleeve, said sleeve sized to provide a friction fit with exterior surfaces of the insect trap,
    an elongated rod, and
    means connected to said sleeve and said rod for rotating said sleeve upon turning said elongated rod to operably position the opening of the insect trap in a desired direction.

2. The apparatus of claim 1 wherein said rotating means comprises a friction ball pin and socket assembly.

3. The apparatus of claim 1 further comprising a means for locking said elongated rod relative to said holder means.

4. The apparatus of claim 1 wherein said elongated rod is telescoping to provide additional reach when positioning the holder means.

5. In combination a box shaped disposable insect trap having two axially aligned openings, and an apparatus for manipulating said trap, comprising:
    a sleeve having an aperture for removably holding said insect trap, said sleeve aperture being axially aligned with the trap openings when the trap is being held by said sleeve, said sleeve sized to provide a friction fit with exterior surfaces of the box shaped insect trap, a friction ball pin and socket assembly including,
   a socket housing having a cavity defined therein, said cavity having a mouth at a first end, a second end of the housing secured to said sleeve perpendicular to said sleeve apertures,
   a ball pin comprising a head frictionally disposed in said cavity, and a shank having an axis extending through the mouth of said cavity, and
   a rod rigidly axially secured to said shank to operably allow rotation of said sleeve upon turning said rod to position an opening of the insert trap in a desired direction.

6. The apparatus of claim 5 further comprising a friction bearing insert disposed in said cavity between the mouth of the socket housing and the head of the ball pin to operably rotate the holder means upon turning the rod.

7. The apparatus of claim 5 wherein the first end of the socket housing includes a top surface and said shank of the ball pin is adapted to rotatably engage said surface to operably rotate the holder means upon turning the rod.

8. The apparatus of claim 7 wherein said surface of the socket housing restricts said shank to 60 degrees from an axis of the socket housing.

9. The apparatus of claim 5 wherein the first end of the socket housing has a surface, said surface having at least one notch therein to allow positioning of the rod at 90° from an axis of the socket housing.

10. The apparatus of claim 5 further comprising means for locking said rod relative to said holder means.

11. The apparatus of claim 5 wherein said rod is telescoping to provide additional reach of the holder means.

12. In combination a box shaped disposable insect trap having two axially aligned openings and an apparatus for manipulating said trap, comprising
   a hollow sleeve having a longitudinal axis sized to provide a friction fit with exterior surfaces of a box shaped insect trap, said sleeve having an aperture aligned and communicating with the trap and said trap openings when said trap is being held by said sleeve,
   a friction ball pin and socket assembly, including,
      a socket housing having a longitudinal axis and having a cavity defined therein, said cavity having a mouth at a first end, a second end of the housing fixedly secured directly to said sleeve, said socket housing longitudinal axis being perpendicular to said sleeve apertures and said sleeve longitudinal axis,
      a ball pin comprising a head located in said cavity, and a shank having an axis extending through the mouth of said cavity,
      a friction bearing insert disposed in said cavity between the socket housing and the ball pin to operably rotate the sleeve upon rotation of the shank, and
   an elongated rod rigidly axially secured to said shank to operably allow rotaty motion of the sleeve upon turning said rod to position an opening of the insect trap in a desired direction.

13. The apparatus of claim 12 wherein the first end of the socket housing has a top surface and said shank of the ball pin is adapted to rotatably engage said surface to operably aid in the rotation of the holder means upon turning the rod.

14. The apparatus of claim 13 wherein said surface of the socket housing restricts said shank to approximately 60 degrees from an axis of the socket housing.

15. The apparatus of claim 12 wherein the first end of the socket housing has a surface, said surface having at least one notch therein to allow positioning of the rod at 90° from an axis of the socket housing.

16. The apparatus of claim 12 further comprising means for locking said elongated rod relative to said holder means.

17. The apparatus of claim 12 wherein said elongated rod is telescoping to provide additional reach of the holder means.

* * * * *